(12) United States Patent
Byun (10) Patent No.: US 11,377,986 B2
(45) Date of Patent: Jul. 5, 2022

(54) APPARATUS AND METHOD FOR CONTROLLING CLUSTER OF VEHICLE

(71) Applicants: HYUNDAI MOTOR COMPANY, Seoul (KR); KIA MOTORS CORPORATION, Seoul (KR)

(72) Inventor: Minwon Byun, Gwangmyeong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 463 days.

(21) Appl. No.: 16/601,904

(22) Filed: Oct. 15, 2019

(65) Prior Publication Data

US 2020/0347759 A1    Nov. 5, 2020

(30) Foreign Application Priority Data

May 2, 2019    (KR) .......................... 10-2019-0051384

(51) Int. Cl.
| | |
|---|---|
| *F01M 1/20* | (2006.01) |
| *G07C 5/02* | (2006.01) |
| *F16N 29/04* | (2006.01) |
| *B60K 37/02* | (2006.01) |
| *B60Q 9/00* | (2006.01) |

(52) U.S. Cl.
CPC .............. *F01M 1/20* (2013.01); *B60K 37/02* (2013.01); *B60Q 9/00* (2013.01); *F16N 29/04* (2013.01); *G07C 5/02* (2013.01); *B60K 2370/152* (2019.05); *B60K 2370/178* (2019.05); *F16N 2210/04* (2013.01); *F16N 2250/04* (2013.01)

(58) Field of Classification Search
CPC ..................... F01M 1/20; F01M 11/10; F01M 2011/1446; B60K 37/02; B60K 2370/152; B60K 2370/178; B60K 2370/168; B60K 2370/48; B60K 35/00; B60K 37/06; B60Q 9/00; F16N 29/04; F16N 2210/04; F16N 2250/04; G07C 5/02; G07C 5/0816; F02N 11/08
USPC ........................................................ 701/33.7
See application file for complete search history.

(56) References Cited

U.S. PATENT DOCUMENTS 3,937,105 A  *  2/1976  Arai ...................... F16H 63/483
                                                           477/906

FOREIGN PATENT DOCUMENTS

| CN | 102787881 A | * | 11/2012 | ............... F01M 1/16 |
| CN | 106968754 A | * | 7/2017 | |
| CN | 105161362 B | * | 3/2018 | |

(Continued)

*Primary Examiner* — Muhammad Shafi
(74) *Attorney, Agent, or Firm* — Morgan, Lewis & Bockius LLP (57) ABSTRACT

An apparatus for controlling a cluster of a vehicle may include, an oil pressure switch (OPS) mounted at an oil passage of an engine, a driving information detection unit configured of receiving an oil pressure signal from the OPS through a connector of the OPS, an OPS connection determination unit configured of determining that the OPS is disconnected when a first waveform voltage determined from a first oil pressure signal detected before the engine is started is the same as a second waveform voltage determined from a second oil pressure signal detected after the engine is started, and a control unit configured of controlling the cluster to turn on a warning lamp in a response that the control unit receives disconnection event information related to the OPS.

15 Claims, 6 Drawing Sheets

(56) References Cited

FOREIGN PATENT DOCUMENTS

| | | | | |
|---|---|---|---|---|
| CN | 109690023 A | * | 4/2019 | ............. F01C 21/10 |
| EP | 3376002 A1 | * | 9/2018 | ............. B60R 16/02 |
| JP | 3820597 B2 | * | 9/2006 | |

* cited by examiner

(A) Normal oil pressure signal with correct connection of OPS (B) Normal oil pressure signal with disconnection of OPS

APPARATUS AND METHOD FOR CONTROLLING CLUSTER OF VEHICLE

CROSS-REFERENCE TO RELATED APPLICATION

The present application claims priority to Korean Patent Application No. 10-2019-0051384 filed on May 2, 2019, the entire contents of which is incorporated herein for all purposes by this reference.

BACKGROUND OF THE INVENTION

Field of the Invention

The present invention relates to an apparatus configured for controlling cluster of a vehicle and a method thereof.

Description of Related Art

A cluster, which is also called an instrument panel, displays various data for driving a vehicle, and warns a driver by a warning lamp when malfunctioning of the vehicle is detected.

For example, the cluster is typically provided with an engine oil lamp which may be turned on when an oil pressure of the engine is low.

It is well known that the oil pressure is very important for normal operation of the engine, and the engine may experience a severe damage when the oil pressure is low.

To warn a low oil pressure of the engine, an oil pressure switch (OPS) is typically installed to the engine to generate a low oil pressure signal when the oil pressure is low, and based on the OPS signal, the warning lamp on the cluster is turned on. When a normal oil pressure signal (OPS-OFF signal) indicating the oil pressure being above a predetermined level is detected, the warning lamp is turned off.

In a normal situation where a connector for the OPS is correctly connected, when an ignition is turned to an ignition-on position, an electrical system of an engine operates. However, the oil pressure is not generated until the engine is started by cranking. Therefore, an engine oil pressure warning lamp is turned on in such an ignition-on state without the running of the engine, and is turned off when the engine is actually started.

However, there may be a case that the connector for the OPS may be disconnected, e.g., by a human error, during an assembly process of the engine or a vehicle. In the instant case, an output signal of the OPS is not detected, and the present situation is the same as that the OPS does not produce a low oil pressure signal. Therefore, in the case of disconnection of a connector or a breakage of signal line of the OPS, the engine oil pressure warning lamp is not turned on even if the oil pressure is low, which means losing the function of monitoring the oil pressure of the engine.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for controlling a cluster of a vehicle having advantages of improved stability in detecting an OPS disconnection based on OPS signals obtained before and after starting an engine of the vehicle.

An exemplary apparatus configured for controlling a cluster of a vehicle may include an oil pressure switch (OPS) mounted at an oil passage of an engine, a driving information detection unit configured of receiving an oil pressure signal from the OPS through a connector of the OPS, an OPS connection determination unit configured of determining that the OPS is disconnected when a first waveform voltage determined from a first oil pressure signal detected before the engine is started is the same as a second waveform voltage determined from a second oil pressure signal detected after the engine is started, and a control unit configured of controlling the cluster to turn on a warning lamp in a response that the control unit receives disconnection event information related to the OPS.

The driving information detection unit may collect driving information including IGN-ON state and IGN-OFF state of the vehicle, and starting and turning off information related to the engine.

The OPS connection determination unit may determine that the OPS is normally connected when a signal transition occurs between the first waveform voltage detected at the IGN-ON state of the vehicle and the second waveform voltage detected after the engine is started.

The OPS connection determination unit may determine that the OPS is disconnected when a signal transition does not occur between the first waveform voltage detected at the IGN-ON state of the vehicle and the second waveform voltage detected after the engine is started.

The control unit may control the warning lamp to blink in a response to the disconnection event information related to the connector of the OPS.

The warning lamp may be a dedicated OPS connector disconnection warning lamp provided in the cluster separately from an engine oil pressure warning lamp.

The control unit is configured of prohibiting, within a predetermined time after turning off of the engine, determining of when the connector of the OPS is disengaged.

An exemplary method for controlling a cluster of a vehicle having an engine and an oil pressure switch (OPS) connected to a connector may include, a) storing first status information related to a first oil pressure signal detected by the OPS before starting of the engine, b) storing second status information related to a second oil pressure signal detected by the OPS after the engine is started, c) determining that the OPS is disconnected when the first status information related to the first oil pressure signal is the same as the second status information related to the second oil pressure signal, and d) turning on a warning lamp of the cluster corresponding to an event of the connector of the OPS being disengaged.

The step a) may include storing a first waveform voltage according to the first oil pressure signal as the first status information when the vehicle enters an IGN-ON state.

The step b) may include storing a second waveform voltage according to the second oil pressure signal as the second status information when the engine is started.

The step c) may include determining that the OPS is disconnected when a signal transition does not occur between the first waveform voltage and the second waveform voltage, and determining that the OPS is normally connected when a signal transition The step d) may include blinking an engine oil pressure warning lamp in the cluster.

The step d) may include blinking an OPS connector disconnection warning lamp provided in the cluster separately from engine oil pressure warning lamp.

It may be configured that the step a) is initiated only after a predetermined time has lapsed after previous turning off of the engine.

According to an exemplary embodiment of the present invention, the OPS connection may be diagnosed based on oil pressure signals detected before and after an engine is started.

Furthermore, low oil pressure detection function may be stably realized since the OPS disconnection may be detected and warned.

Furthermore, the function of an exemplary embodiment of the present invention may be implemented as software processes without employing additional hardware parts, i.e., without incurring additional costs. Furthermore, an apparatus and a method of an exemplary embodiment of the present invention may prevent malfunctioning of a vehicle or damages to the vehicle which may be possibly introduced by human errors involved during an assembly process.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Furthermore, unless explicitly described to the contrary, the word "comprise" and variations such as "comprises" or "comprising", will be understood to imply the inclusion of stated elements but not the exclusion of any other elements. Furthermore, the terms "-er", "-or" and "module" described in the specification mean units for processing at least one function and operation and may be implemented by hardware components or software components and combinations thereof.

In the exemplary embodiment, it is to be understood that when one component is referred to as being "connected" or "coupled" to another component, it may be connected or coupled directly to the other component or be connected or coupled to the other component with a further component intervening therebetween. In the exemplary embodiment, it is to be understood that when one component is referred to as being "connected or coupled directly" to another component, it may be connected to or coupled to the other component without another component intervening therebetween.

A controller or control unit may include at least one microprocessor programmed to perform specific functions, the program including a set of computer readable instruction for performing the specific functions described in the following description.

An apparatus and a method for controlling a cluster of a vehicle according to an exemplary embodiment of the present invention are hereinafter described in detail with reference to the drawings.

Figure 1:
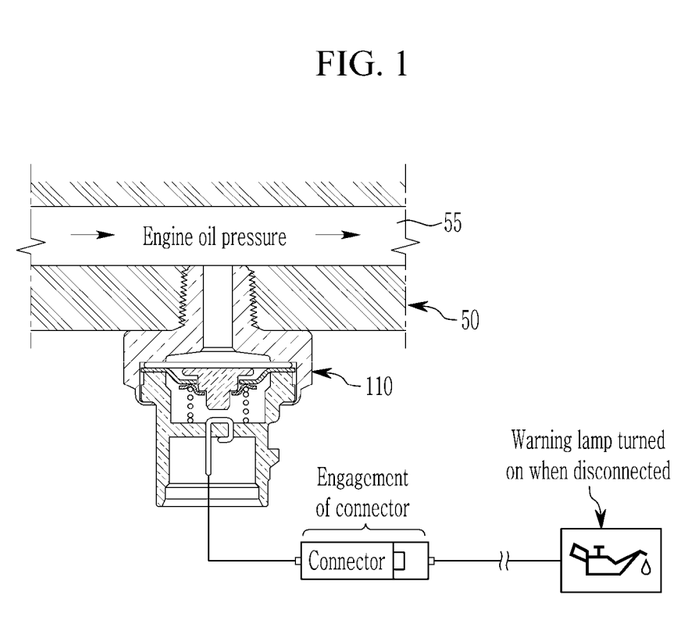
FIG. 1 schematically illustrates an oil pressure switch (OPS) mounted to an engine to detect oil pressure of an oil passage of the engine, according to an exemplary embodiment of the present invention.

FIG. 1 schematically illustrates an oil pressure switch (OPS) mounted to an engine to detect oil pressure of an oil passage of the engine.

Figure 2:
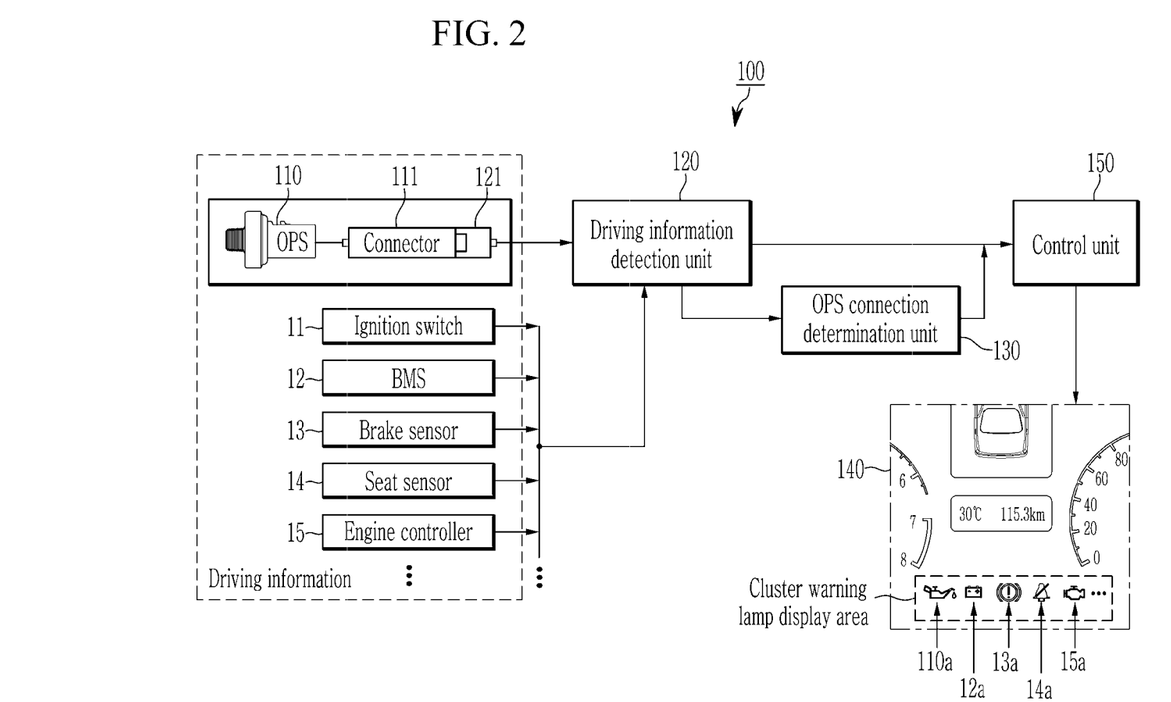
FIG. 2 is a block diagram schematically illustrating an apparatus configured for controlling a cluster of a vehicle according to an exemplary embodiment of the present invention.

FIG. 2 is a block diagram schematically illustrating an apparatus configured for controlling a cluster of a vehicle according to an exemplary embodiment of the present invention.

Referring to FIG. 2, an apparatus 100 according to an exemplary embodiment of the present invention is configured for controlling a cluster 140 of a vehicle, and includes an oil pressure switch (OPS) 110, a driving information detection unit 120, an OPS connection determination unit 130, and a control unit 150.

As shown in FIG. 1, the OPS 110 is mounted to an engine 50 to detect an oil pressure of an oil passage 55 of the engine 50.

Although FIG. 1 illustrates that the OPS 110 as a mechanical switch acting on a pressure of the oil passage 55, the present invention is not limited thereto. It may be understood that an electronic sensor or any other type that sends a signal and is connected to a connector may be applied with the present invention.

The OPS 110 outputs a low oil pressure signal (OPS-ON signal) when the oil pressure of the oil passage 55 of the engine 50 is low, i.e., below the predetermined oil pressure level, for example, in the case that the engine 50 is not started, malfunctioning of a hydraulic pump of the engine 50, etc.

The OPS 110 outputs a normal oil pressure signal (OPS-OFF signal) when the oil pressure of the oil passage 55 of the engine 50 is normal, i.e., above a predetermined oil pressure level. The structure of the OPS 110 is illustrated in FIG. 1 as a mere example known to a person skilled in the art, and the present invention is not limited thereto.

The driving information detection unit 120 collects driving information related to the vehicle through various sensors and/or controllers.

For example, the driving information detection unit 120 may detect an engine state, e.g., ignition-on (IGN-ON) or ignition-off (IGN-OFF), of the engine 50 by an output signal of an ignition switch 11.

The driving information detection unit 120 may determine whether the engine 50 is running according to a signal, e.g., an engine rpm, from an engine controller 15.

The driving information detection unit 120 receives an output signal of the OPS 110 through an input terminal 121 which is connected to a connector 111 of the OPS 110.

Furthermore, the driving information detection unit 120 may further receive signals from a battery management system (BMS) 12, a brake sensor 13, a seat sensor 14, and an engine controller 15.

The OPS connection determination unit 130 receives data from the driving information detection unit 120, and analyzes the data to determine whether the connector 111 of the OPS 110 is correctly connected to the input terminal 121.

The control unit 150 controls the cluster 140 to display a warning lamp in a warning lamp display area when an abnormal operation is detected, e.g., when the connector 111 of the OPS 110 is not correctly connected to the input terminal 121.

Figure 3:
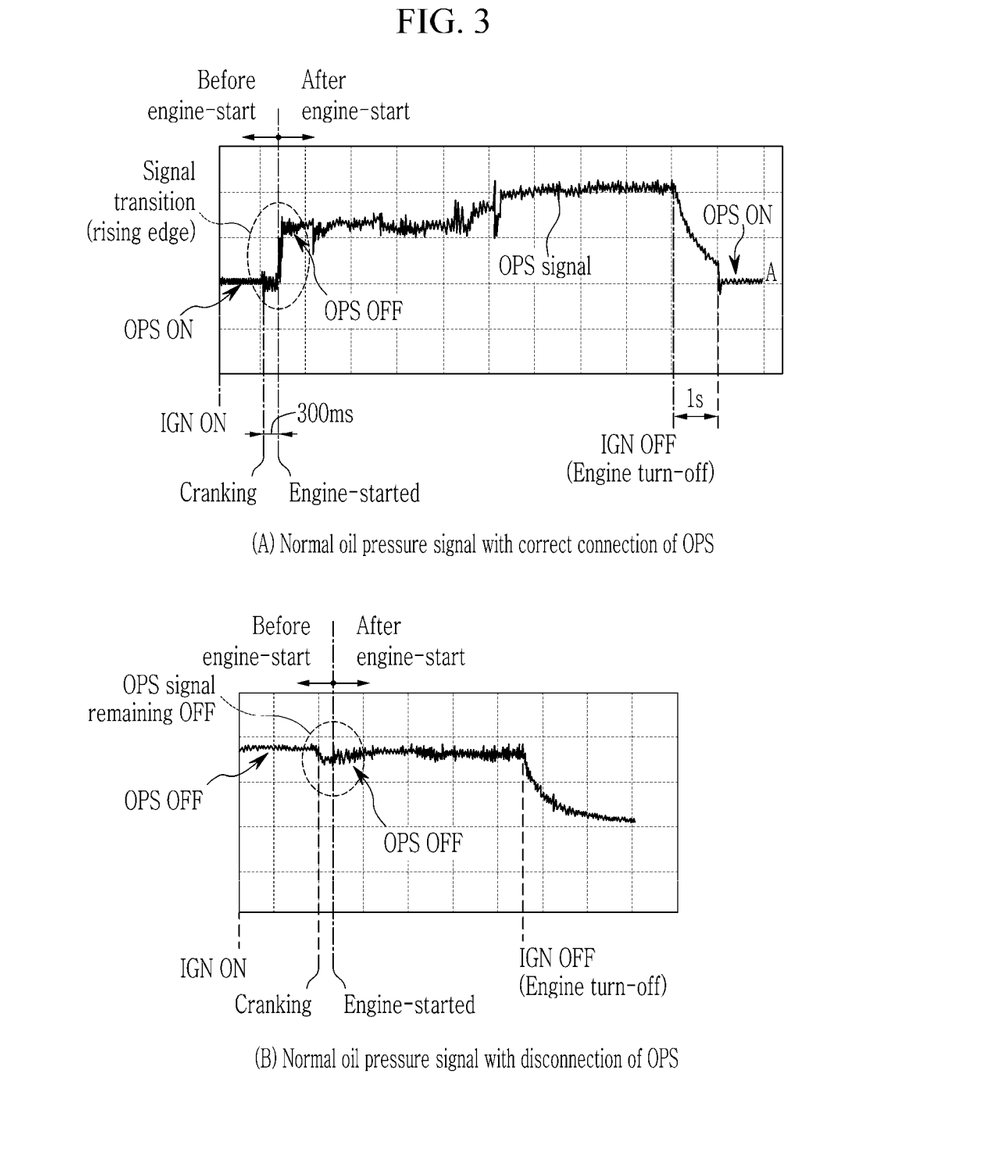
FIG. 3 illustrates oil pressure signal waveforms obtained when an OPS connector is connected or disconnected according to an exemplary embodiment of the present invention.

FIG. 3 illustrates oil pressure signal waveforms obtained when an OPS connector is connected or disconnected according to an exemplary embodiment of the present invention.

Referring to FIG. 3(A), the low oil pressure signal (OPS-ON signal) is detected by the OPS 110 in the IGN-ON state of the vehicle before starting the engine 50, when the connection of the connector 111 of the OPS 110 is correct. When the engine 50 is started, oil pressure is generated at the oil passage 55 and rises to a predetermined level after cranking of the engine. In the instant case, a normal oil pressure signal (OPS-OFF signal) is detected by the OPS 110. When the engine is turned off afterwards, the oil pressure decays and the low oil pressure signal (OPS-ON signal) is detected.

The OPS connection determination unit 130 may compare a first waveform voltage of the oil pressure signal of the OPS detected at IGN-ON of the vehicle before an engine start and a second waveform voltage of the oil pressure signal of the OPS detected when the engine 50 is started. The OPS connection determination unit 130 may determine that the OPS 110 is correctly connected when a signal transition is detected between the first and second waveform voltage of the OPS signal, e.g., when a voltage change between the first and second waveform voltage is above a predetermined difference.

Therefore, referring to FIG. 3(A), since a first waveform voltage of a low oil pressure signal (OPS-ON signal) is detected before the engine is started 50, and a second waveform of a normal oil pressure signal (OPS-OFF signal) is detected after the engine is started 50, the OPS connection determination unit 130 determines that the OPS is correctly connected.

However, referring to FIG. 3(B), when the connector 111 of the OPS 110 is disconnected, the oil pressure signal forms the normal oil pressure signal (OPS-OFF signal) regardless of whether the engine 50 is started. In the instant case, the OPS connection determination unit 130 determines that the OPS 110 is disconnected since the oil pressure detected before and after the engine 50 is started remains the same, or equivalently, with a difference below the predetermined voltage difference.

When the OPS 110 is disconnected, the OPS connection determination unit 130 sends disconnection event information to the control unit 150.

The OPS connection determination unit 130 may be configured to transmit only the disconnection event information to the control unit 150, without sending normal connection event information to the control unit 150. This may reduce data transaction between the OPS connection determination unit 130 and the control unit 150, reducing a processing load of the control unit 150.

The OPS connection determination unit 130 may be formed as an electronic control unit including at least one microprocessor programmed to perform a specific function described above.

In a response to a control signal of the control unit 150, the cluster 140 may turn on a warning lamp, for example, an engine oil pressure warning lamp 110a in response a low oil pressure signal of the OPS 110, a battery warning lamp 12a in a response to low battery signal of the BMS 12, a brake warning lamp in a response to a brake signal of the brake sensor 13, a seatbelt warning lamp in a response to a signal of the seat sensor 14, and an engine malfunction warning lamp in a response to a signal of the engine controller 15.

The cluster 140 may merely turn on the corresponding warning lamp, and may blink the corresponding warning lamp. Furthermore, the cluster 140 may display various images corresponding to the warning lamps.

The control unit 150 controls functions of the cluster 140, and may be an electronic control unit (ECU) including at least one microprocessor programmed to perform a specific function described below.

The control unit 150 may determine an IGN-ON state of the vehicle, and engine-start or turning off of the engine, based on driving information received from the driving information detection unit 120.

Upon receiving the normal oil pressure signal (OPS-OFF signal), the control unit 150 controls the cluster 140 to turn off the engine oil pressure warning lamp 110a.

Upon receiving the low oil pressure signal (OPS-ON signal), the control unit 150 controls the cluster 140 to turn on the engine oil pressure warning lamp 110a.

Upon receiving the disconnection even information related to the OPS 110 from the OPS connection determination unit 130, the control unit 150 controls the cluster 140 to turn on the engine oil pressure warning lamp 110a.

The cluster 140 may merely turn on or blink the warning lamp corresponding to the OPS 110 disconnection event information.

A method for controlling a cluster of a vehicle according to an exemplary embodiment of the present invention is described in detail with reference to the above apparatus 100 and the drawings.

Figure 4:
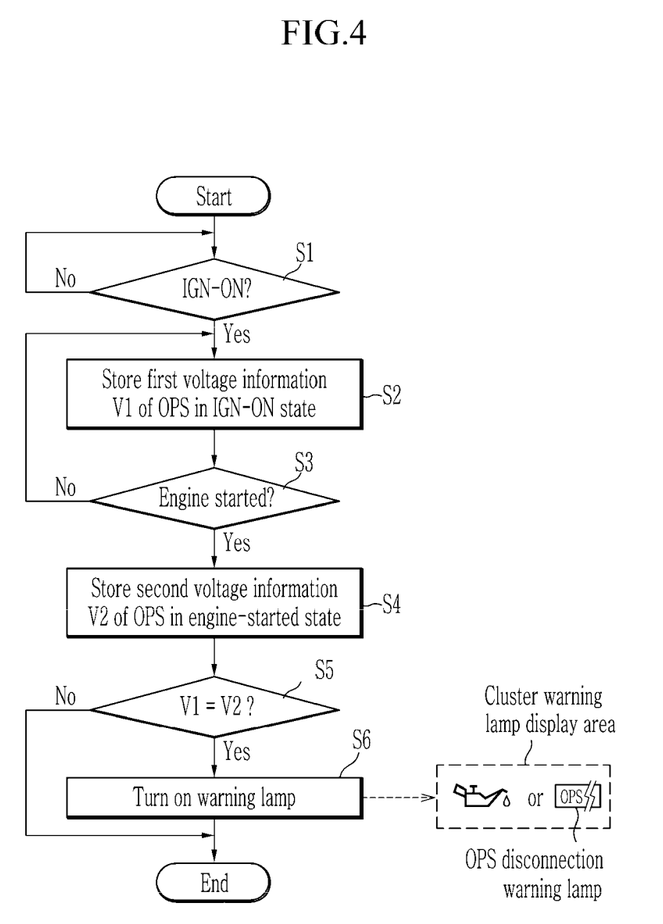
FIG. 4 is flowchart showing a method for controlling a cluster of a vehicle according to an exemplary embodiment of the present invention.

FIG. 4 is flowchart showing a method for controlling a cluster of a vehicle according to an exemplary embodiment of the present invention.

Referring to FIG. 4, at step S1, the OPS connection determination unit 130 determines whether an IGN-ON state of the vehicle is met, e.g., by an ignition key operation of a driver. When the IGN-ON state is met, the OPS connection determination unit 130 stores, at step S2, first status information V1 of the first oil pressure signal detected by the OPS 110, e.g., in an internal memory. The first status information V1 may indicate the first waveform voltage according to the first oil pressure signal before starting the engine 50. It may be understood that the ignition key operation is not limited to a key fob rotation, and may also include smart key button pressing input.

As such, at step S3, the OPS connection determination unit 130 determines whether the engine 50 is started, e.g., by an ignition key operation of a driver. When the engine 50 is started, the OPS connection determination unit 130 stores, at step S4, second status information V2 of the second oil pressure signal detected by the OPS 110, e.g., in the internal memory. The second status information V2 may indicate the second waveform voltage according to the second oil pressure signal after starting the engine 50.

At step S5, the OPS connection determination unit 130 compares the first and second status information V1 and V2, i.e., the first and second waveform voltages of the first and second oil pressure signals before and after the starting of the engine. When the first and second status information V1 and V2 are the same, i.e., when the first and the second waveform voltages are within a predetermined voltage difference (S5; Yes), the OPS connection determination unit 130 determines that the OPS 110 is disconnected. The first and second status information V1 and V2 being the same implies that the output voltage of the OPS 110 is not changed, i.e., there has been no signal transition, between before and after the engine is started.

When it is determined the OPS 110 is disconnected at the step S5, the OPS connection determination unit 130 sends the disconnection event information to the control unit 150 at step S6, and therefore, the control unit controls the cluster 140 to turn on a warning lamp corresponding to the disconnection event of the OPS 110.

The cluster 140 may merely turn on or blink the corresponding warning lamp. A conventional engine oil pressure warning lamp may be used as the corresponding warning lamp, or a dedicated OPS connector disconnection warning lamp may be additionally prepared and used as the corresponding warning lamp, as shown in FIG. 4.

When the first and second status information V1 and V2 are not the same at the step S5, the OPS connection determination unit 130 does not send any event information to the control unit 150. Therefore, the cluster 140 maintains the corresponding warning lamp to be turned off, since the control unit 150 does not send any lighting signal to the cluster 140.

It may be understood that the step S1 and step S3 may be respectively repeated until the IGN-ON state is met and until the engine 50 is started.

Figure 5:
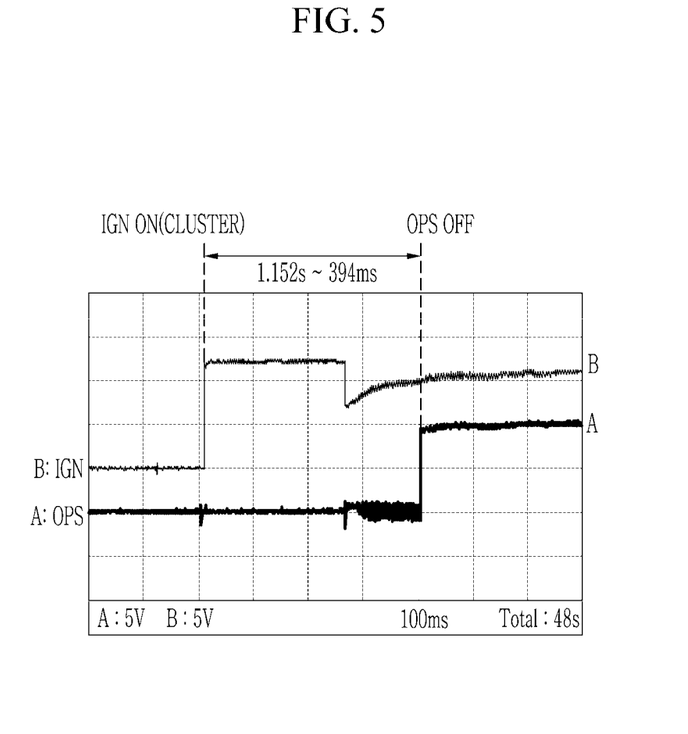
FIG. 5 illustrates a result of a verification test of an apparatus and a method of an exemplary embodiment of the present invention, where the engine is abruptly started by a fast ignition key operation.
Figure 6:
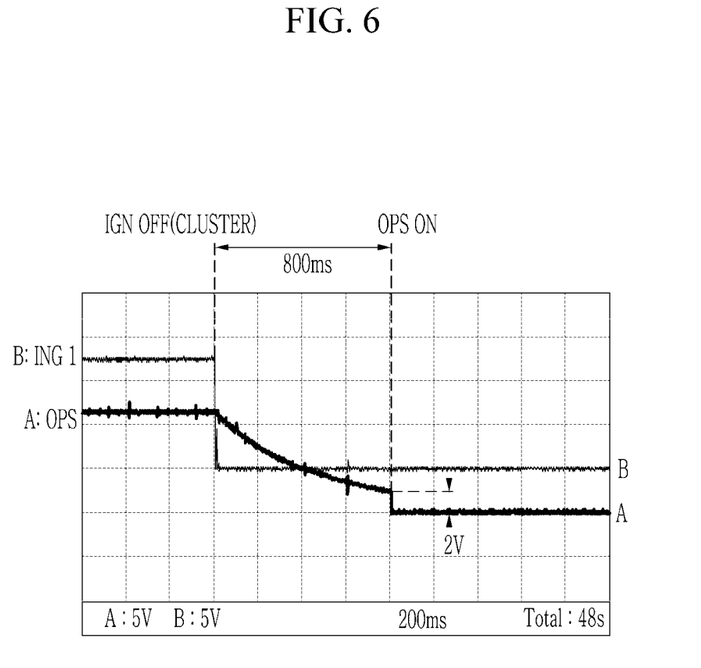
FIG. 6 illustrates a result of verification test of an apparatus and a method of an exemplary embodiment of the present invention, where the engine is immediately restarted after turning off.

FIG. 5 and FIG. 6 illustrates results of extreme tests for verifying stability of an exemplary embodiment of the present invention.

FIG. 5 illustrates a result of a verification test of an apparatus and a method of an exemplary embodiment of the present invention, where the engine 50 is abruptly started by a fast ignition key operation.

Referring to FIG. 5, when the key fob is abruptly operated from insertion to cranking position, the period from the IGN-ON time to the OPS-OFF time, i.e., time lapsed until the OPS 110 actually changes the output signal from the time point of IGN-ON, has been experimentally found to be 394 ms to 1.152 sec, depending on situations. In more detail, the period has been found to be 1.152 sec after 24 hour soaking of the engine, 368 ms after 10 minutes of idling after 24 hour soaking, and 394 ms after 20 minutes of constant speed driving after 24 hour soaking.

In comparison, it has been experimentally found that a time required for detecting the oil pressure signal after IGN-ON is about 30 msec.

This means that sufficient time exists to detect the first waveform voltage of the OPS after the IGN-ON until the OPS signal changes according to cranking of the engine. Therefore, the first waveform voltage may not be missed, and sufficient stability of the method for controlling the cluster according to an exemplary embodiment of the present invention may be ensured.

FIG. 6 illustrates a result of verification test of an apparatus and a method of an exemplary embodiment of the present invention, where the engine is immediately restarted after turning off.

Referring to FIG. 6, it has been found that when a reference voltage for determining low and normal oil pressure is 2V of the OPS voltage, a time for the OPS signal to decay below the criteria is 800 msec. That is, it takes about 800 ms until the voltage of the OPS decays below 2V after the engine is turned off.

This means that the OPS connection may be wrongly determined to be disconnected when the engine is restarted immediately, i.e., within 800 ms after being turned off.

Therefore, according to an exemplary embodiment of the present invention, within a predetermined time (e.g., 800 ms) after the engine is turned off, the OPS connection determination unit 130 prohibits the determination of the OPS disconnection and turning on of the corresponding warning lamp. That is, the OPS connection determination unit 130 may newly initiate the step S1 only when the predetermined time has lapsed after the engine is turned off previously, i.e., after the step.

By such a configuration, false determination of the OPS disconnection may be prevented, and reliability of the method according to an exemplary embodiment of the present invention may be further improved.

In another exemplary embodiment of the present invention, the control unit 150 may include the functions of the driving information detection unit 120 and/or the OPS connection determination unit 130 in a way of hardware or software.

According to an exemplary embodiment of the present invention, the OPS connection may be diagnosed based on oil pressure signals detected before and after an engine is started.

Furthermore, low oil pressure detection function may be stably realized since the OPS disconnection may be detected and warned.

Furthermore, the function of an exemplary embodiment of the present invention may be implemented as software processes without employing additional hardware parts, i.e., without incurring additional costs. Furthermore, an apparatus and a method of an exemplary embodiment of the present invention may prevent malfunctioning of a vehicle or damages to the vehicle which may be possibly introduced by human errors involved during an assembly process.

The exemplary embodiment of the present invention is not limited to be implemented only by the aforementioned apparatus and/or method, and may be implemented by a program for operating a function corresponding to the configuration of the exemplary embodiment of the present invention, a recording medium in which the program is recorded, and the like, and the implementation may be easily realized from the description of the aforementioned exemplary embodiment of the present invention by those skilled in the art.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus for controlling a cluster of a vehicle, the apparatus comprising:
   an oil pressure switch (OPS) mounted at an oil passage of an engine;
   a driving information detection unit configured of receiving an oil pressure signal from the OPS through a connector of the OPS;
   an OPS connection determination unit configured of determining that the OPS is disconnected when a first status information determined from a first oil pressure signal detected before the engine is started is as same as a second status information determined from a second oil pressure signal detected after the engine is started; and
   a control unit configured of controlling the cluster to turn on a warning lamp of the cluster in a response that the control unit receives disconnection event information related to the OPS.

2. The apparatus of claim 1, wherein the first status information includes a first waveform voltage and the second status information includes a second waveform voltage.

3. The apparatus of claim 2, wherein the driving information detection unit is configured of collecting driving information including IGN-ON state and IGN-OFF state of the vehicle, and starting and turning off information related to the engine.

4. The apparatus of claim 2, wherein the OPS connection determination unit is configured of determining that the OPS is normally connected when a signal transition occurs between the first waveform voltage detected at the IGN-ON state of the vehicle and the second waveform voltage detected after the engine is started.

5. The apparatus of claim 4, wherein the OPS connection determination unit is configured of determining that the OPS is disconnected when the signal transition does not occur between the first waveform voltage detected at the IGN-ON state of the vehicle and the second waveform voltage detected after the engine is started.

6. The apparatus of claim 2, wherein the control unit is configured to control the warning lamp to blink in a response to determine the disconnection event information related to the connector of the OPS.

7. The apparatus of claim 6, wherein the warning lamp is a dedicated OPS connector disconnection warning lamp provided in the cluster separately from an engine oil pressure warning lamp.

8. The apparatus of claim 6, wherein the control unit is configured of prohibiting, within a predetermined time after turning off of the engine, determining of when the connector of the OPS is disengaged.

9. A method of controlling a cluster of a vehicle having an engine and an oil pressure switch (OPS) connected to a connector, the method comprising:
   a) storing first status information related to a first oil pressure signal detected by the OPS before the engine is started;
   b) storing second status information related to a second oil pressure signal detected by the OPS after the engine is started;
   c) determining that the OPS is disconnected when the first status information related to the first oil pressure signal is as same as the second status information related to the second oil pressure signal; and
   d) turning on a warning lamp of the cluster corresponding to an event of the connector of the OPS being disengaged.

10. The method of claim 9, wherein the step a) includes:
    storing a first waveform voltage according to the first oil pressure signal as the first status information when the vehicle enters an IGN-ON state.

11. The method of claim 9, wherein the step b) includes:
    storing a second waveform voltage according to the second oil pressure signal as the second status information when the engine is started.

12. The method of claim 11, wherein the step c) includes:
    determining that the OPS is disconnected when a signal transition does not occur between the first waveform voltage and the second waveform voltage; and
    determining that the OPS is normally connected when the signal transition occurs between the first waveform voltage and the second waveform voltage.

13. The method of claim 9, wherein the step d) includes:
    blinking an engine oil pressure warning lamp in the cluster.

14. The method of claim 9, wherein the step d) includes:
    blinking an OPS connector disconnection warning lamp provided in the cluster separately from an engine oil pressure warning lamp.

15. The method of claim 9, wherein the step a) is initiated only after a predetermined time has lapsed after previous turning off of the engine.

* * * * *